(12) United States Patent
Kuno

(10) Patent No.: US 8,567,868 B2
(45) Date of Patent: Oct. 29, 2013

(54) VEHICLE SEAT

(75) Inventor: Satoru Kuno, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 287 days.

(21) Appl. No.: 13/084,610

(22) Filed: Apr. 12, 2011

(65) Prior Publication Data

US 2011/0260506 A1     Oct. 27, 2011

(30) Foreign Application Priority Data

Apr. 23, 2010    (JP) .................................. 2010-099642

(51) Int. Cl.
*B60N 2/44*     (2006.01)
*A47C 7/50*     (2006.01)

(52) U.S. Cl.
USPC .................................. 297/423.3; 297/423.36

(58) Field of Classification Search
USPC ............................. 297/284.11, 423.3, 423.36
See application file for complete search history.

(56) References Cited

U.S. PATENT DOCUMENTS

| | | | | |
|---|---|---|---|---|
| 4,336,965 A | * | 6/1982 | Lipp | 297/423.36 |
| 6,095,610 A | * | 8/2000 | Okajima et al. | 297/423.36 |
| 6,517,160 B2 | * | 2/2003 | Marcantoni | 297/423.36 |
| 6,685,271 B1 | * | 2/2004 | Chang | 297/423.4 |
| 6,926,366 B2 | * | 8/2005 | Wolters | 297/423.36 |
| 7,108,322 B2 | * | 9/2006 | Erker | 297/284.11 |
| 7,273,257 B2 | * | 9/2007 | De Vroe | 297/452.26 |
| 8,016,355 B2 | * | 9/2011 | Ito et al. | 297/337 |
| 2001/0048239 A1 | * | 12/2001 | Kogure | 297/423.2 |
| 2006/0186721 A1 | * | 8/2006 | Flory et al. | 297/423.36 |
| 2010/0259081 A1 | | 10/2010 | Kuno | |

FOREIGN PATENT DOCUMENTS

| | | |
|---|---|---|
| JP | 2006-43240 | 2/2006 |
| JP | 4324444 | 6/2009 |

OTHER PUBLICATIONS

U.S. Appl. No. 13/152,593 to Satoru Kuno, which was filed on Jun. 3, 2011.

* cited by examiner

*Primary Examiner* — Peter Brown
(74) *Attorney, Agent, or Firm* — Greenblum & Bernstein, P.L.C.

(57) ABSTRACT

In a vehicle seat, an ottoman portion that includes a shaft member that attaches to the sitting portion, a first frame member that rotates about the shaft member, and a second frame member that is fixed to a cushion. One side of the first frame member is attached to one side of the second frame member, and the other side of the first frame member is attached to the shaft member. From a position in which the other side of the second frame member that faces the cushion is close to the other side of the first frame member to a second position in which the ottoman portion is extended in front of the seat from the sitting portion so as to support a calf of the occupant, the other side of the second frame member and the other side of the first frame member spread apart.

6 Claims, 6 Drawing Sheets

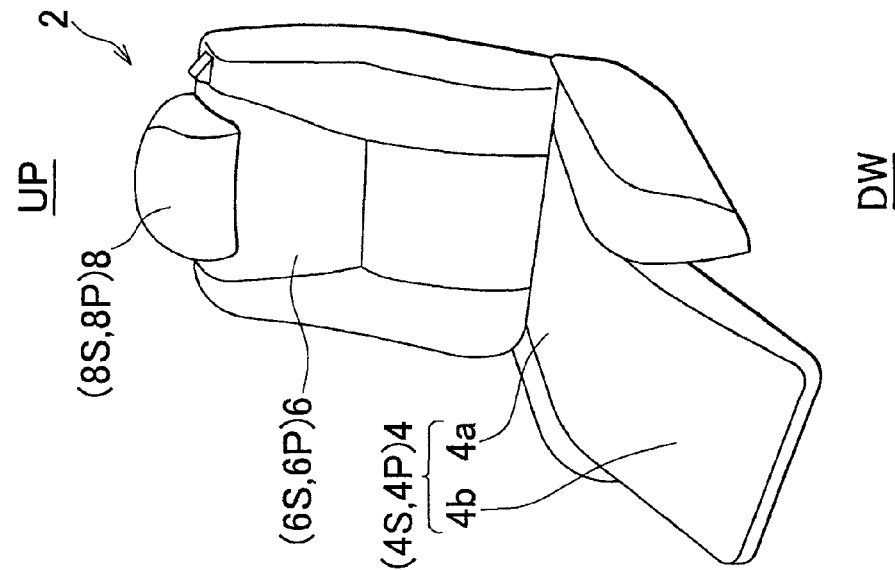
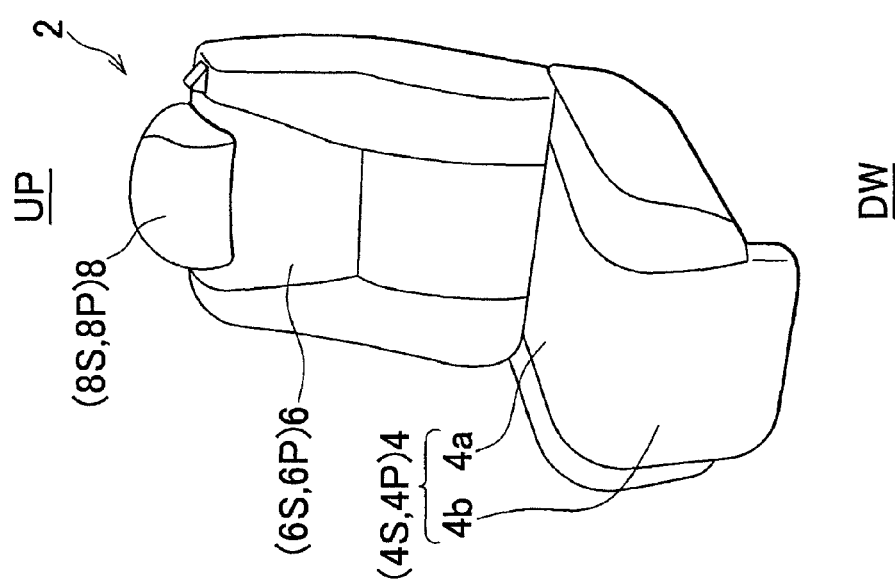

VEHICLE SEAT

INCORPORATION BY REFERENCE

The disclosure of Japanese Patent Application No. 2010-099642 filed on Apr. 23, 2010 including the specification, drawings and abstract is incorporated herein by reference in its entirety.

BACKGROUND OF THE INVENTION

1. Field of the Invention

The invention relates to a vehicle seat that has a seat cushion, the length dimension of which can be changed, and an ottoman (a mechanism that is able to support the calves of an occupant).

2. Description of Related Art

Japanese Patent No. 4324444 describes one such vehicle seat according to related art. With this vehicle seat, a seat cushion has a sitting portion on which an occupant can sit, and an ottoman portion that is connected to a front end of the sitting portion. The ottoman portion can be displaced between a first position and a second position. In the first position, the ottoman portion points downward with respect to the seat and is compactly arranged in a lower portion of the seat so as not to get in the way of the occupant (i.e., the bent legs of the occupant). Also, in the second position, the ottoman portion is extended out in front of the seat from the sitting portion and supports the calves of the occupant.

Here, the related seat cushion has a cushion that forms the contour of the seat, and a plurality of mechanisms (i.e., a link mechanism and a pivoting mechanism) below the cushion. The cushion is a member that can elastically expand and contract, and the ottoman portion and the sitting portion are formed so as to be continuous. The ottoman portion swings (i.e., slides) in the longitudinal direction of the seat with respect to the sitting portion. Also, the pivoting mechanism enables the ottoman portion to rotate about a front end of the sitting portion. With this related art, the ottoman portion in the first position is slid by the link mechanism until it contacts the calves of the occupant. Sliding the ottoman portion (i.e., performing a seat length changing operation) in this way enables the length dimension of the seat cushion to be extended. Then, the ottoman can be extended in front of the seat (i.e., displaced to the second position) by rotating ottoman portion about the front end of the sitting portion by the pivoting mechanism.

SUMMARY OF THE INVENTION

With the related art, the structure is such that the seat length changing operation and the positional displacement operation are performed separately by a plurality of mechanisms (i.e., the link mechanism and the pivoting mechanism). Therefore, this structure is difficult to employ considering the compactness and manufacturing costs and the like of the seat.

Therefore, the invention provides a vehicle seat in which the length dimension of a seat cushion can be changed by a simpler mechanism.

One aspect of the invention relates to a. vehicle seat that includes a seat cushion that has a cushion that forms a seat contour and elastically extends and contracts.

The cushion has a sitting portion on which an occupant sits, and an ottoman portion arranged on one side of the sitting portion. The ottoman portion has a shaft member that attaches to the sitting portion, a first frame member that rotates about the shaft member, and a second frame member that is fixed to the cushion. One side of the first frame member is attached to one side of the second frame member, and the other side of the first frame member is attached to the shaft member. The ottoman portion is displaced between a first position in which the ottoman portion is bent pointing downward, with respect to the seat, from the sitting portion, and a second position in which the ottoman portion is extended in front of the seat from the sitting portion so as to support a calf of the occupant, according to an operation in which the first frame member rotates about the shaft member. In the first position, the other side of the second frame member that faces the cushion is close to the other side of the first frame member, and the other side of the second frame member and the other side of the first frame member spread apart by elastic extension of the cushion, such that a length dimension of the seat cushion increases, with displacement from the first position to the second position.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 1A and 1B are perspective views of a vehicle seat according to an example embodiment of the invention, with FIG. 1A being a view of an ottoman portion in a first position, and FIG. 1B being a view of the ottoman portion in a second position;

DETAILED DESCRIPTION OF EMBODIMENTS

Figure 2A:
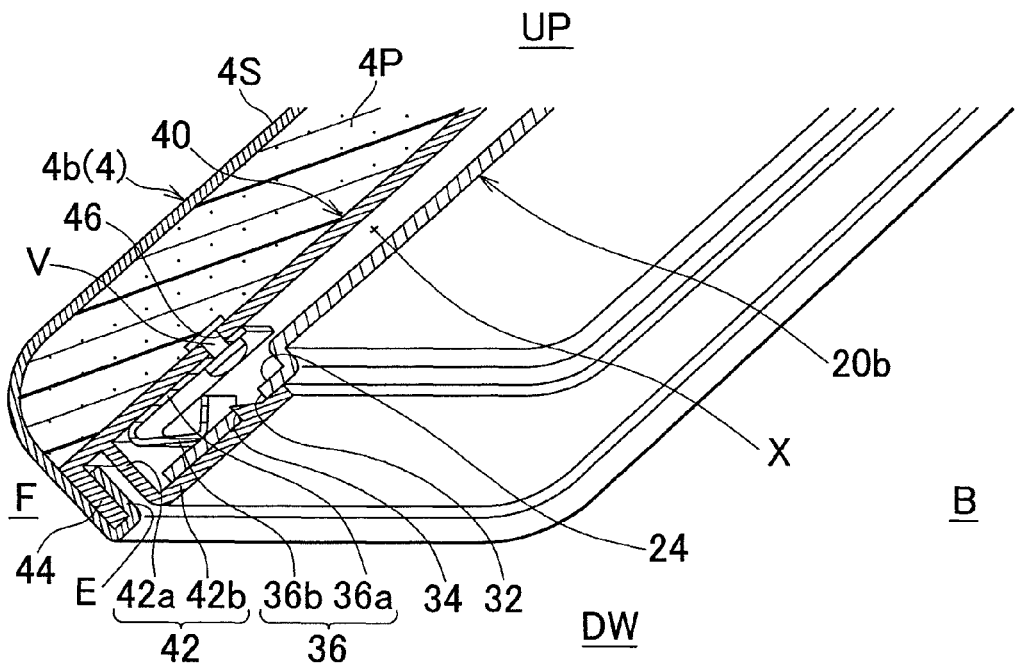
FIG. 2A is a longitudinal sectional view schematically showing a portion of the ottoman portion when locked.

Hereinafter, an example embodiment of the invention will be described with reference to FIGS. 1A to 6. Incidentally, in FIGS. 5 and 6, some of the members (such as the lock mechanism) are omitted or simplified for the sake of convenience. Also, in the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat. A vehicle seat 2 in FIG. 1 has a seat cushion 4, a seat back 6, and a headrest 8. Each of these seat structures has a cushion 4P, 6P, and 8P that forms the contour of the seat, and cover material 4S, 6S and 8S that covers the cushion.

The seat cushion 4 has a sitting portion 4a and an ottoman portion 4b (see FIGS. 1A and 1B; these members will be described in detail later). The ottoman portion 4b is able to be displaced between a first position and a second position (see FIGS. 1A, 1B, 5, and 6). In the first position, the ottoman portion 4b points downward with respect to the seat and is compactly arranged so as not to get in the way of an occupant (i.e., the bent legs L of an occupant). In the second position, the ottoman portion 4b is extended in front of the seat from the sitting portion 4a, and is able to support the calves C of the occupant.

In this example embodiment, the length dimension of the seat cushion 4 can be changed (see FIG. 3) by moving the ottoman portion 4b during positional displacement in front of the seat from the sitting portion 4a. In order to be able to change the length dimension of the seat cushion 4 by a simpler structure in this kind of seat, the seat according to this example embodiment employs structures that will be described later. Each of the structures will be described below.

[Seat Cushion]

The seat cushion 4 has the cushion 4P, the cover material 4S, the sitting portion 4a, and the ottoman portion 4b, as described above (see FIGS. 1A to 3). The cover material 4S is bag-shaped material that can cover the cushion 4P and is able to expand and contract in response to the elastic expansion and contraction of the cushion 4P. The cover material 4S may be fabric (woven, knit, or nonwoven), leather (natural leather or synthetic leather), or a net board.

The cushion 4P is a member that can elastically expand and contract, and is a single continuous member that forms the contour (generally rectangular) of the sitting portion 4a and the ottoman portion 4b. The rear portion side of the cushion 4P Bourns the sitting portion 4a that will be described later, and the front portion side of the cushion 4P forms the ottoman portion 4b. The cushion 4P is made of material that can elastically expand and contract, such as a urethane pad. In this example embodiment, after covering the cushion 4P with the cover material 4S (that is bag-shaped), the end of the cover material 4S is fixed to the ottoman portion 4b (i.e., a second frame member) that will be described later. Here, the cushion 4P has a plurality of concave portions 9 (only one of which is denoted by a reference character in FIGS. 3 to 6). The plurality of concave portions 9 may be formed midway in a lower portion of the cushion 4P (i.e., in a portion where the sitting portion 4a and the ottoman portion 4b are connected). This plurality of concave portions 9 facilitates bending deformation of the ottoman portion 4b with respect to the sitting portion 4a.

[Sitting Portion]

The sitting portion 4a (that has a flat shape) is a portion on which an occupant can sit (see FIG. 1). The sitting portion 4a has a frame member, not shown, that supports the cushion 4P (i.e., the rear portion thereof). In this example embodiment, the legs L of the occupant are bent as a result of the occupant sitting on the sitting portion 4a (see FIG. 5). At this time, the knee region of the occupant (i.e., the center of rotation R0 of the legs L of the occupant) is slightly in front, with respect to the seat, of the front end of the sitting portion 4a.

[Ottoman Portion]

The ottoman portion 4b (that has a flat shape) is a portion able to support the calves C of the occupant, and is arranged on the front portion side of the sitting portion 4a (see FIGS. 1A, 1B, and 3 to 6). The ottoman portion 4b of this example embodiment is able to be displaced between a first position and a second position, and has a shaft member 10, a first frame member 20a, a connecting frame member 20b, a second frame member 40, lock mechanisms 32, 34, and 36, and a spreading member 50 (see FIGS. 3 and 4). The ottoman portion 4b is able to move away from the sitting portion 4a in response to a positional displacement operation that will be described later.

(Shaft member)

The shaft member 10 is a long rod-shaped member that extends in the width direction of the seat. In this example embodiment, the shaft member 10 is arranged at a front portion (i.e., a frame member) of the sitting portion 4a via a support bracket, not shown, while facing in the width direction of the seat. The first frame member 20a that will be described later is rotatably attached to this shaft member 10.

(First Frame Member)

Figure 3:
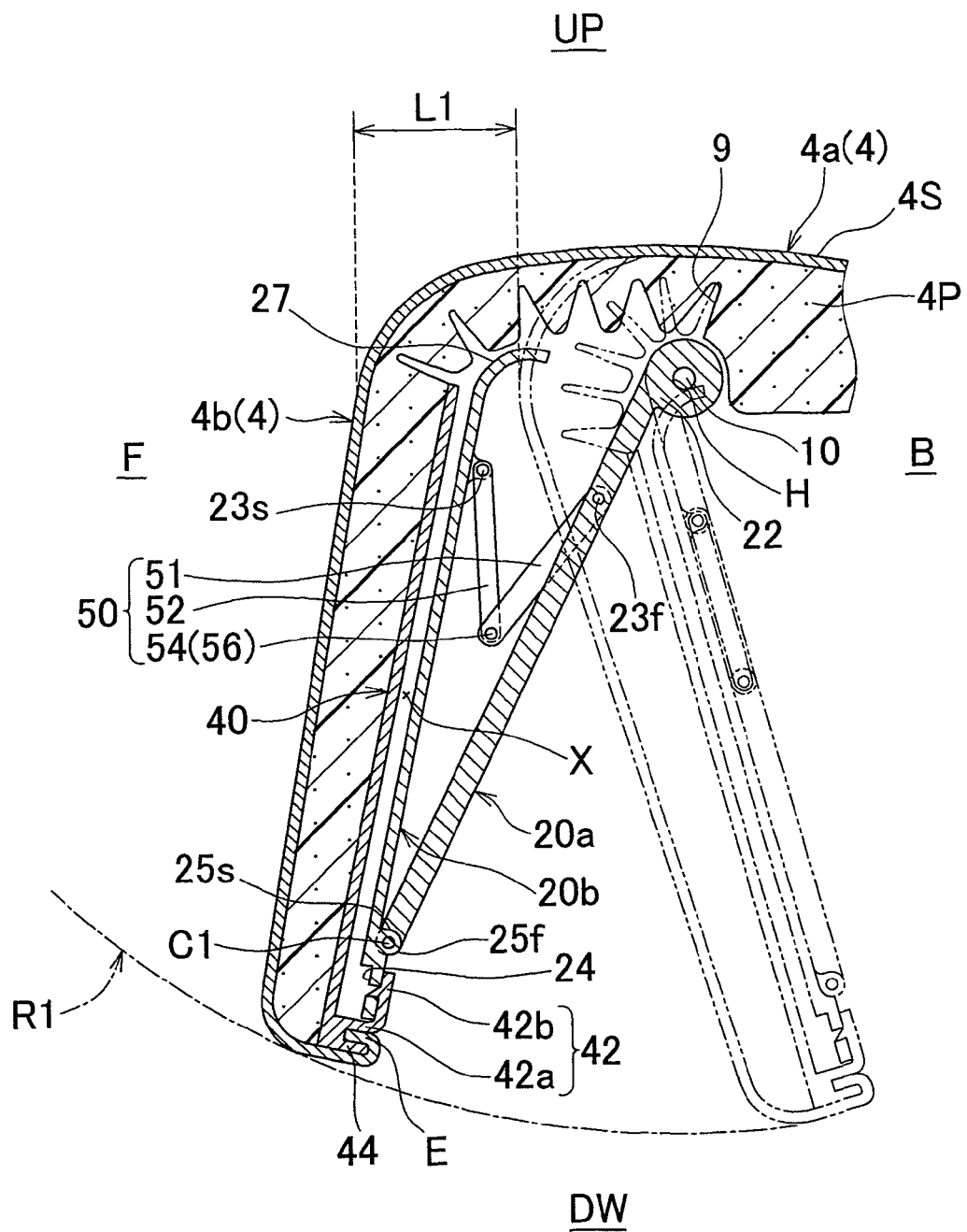
FIG. 3 is a longitudinal sectional view of a portion of a seat cushion according to the example embodiment of the invention.
Figure 4:
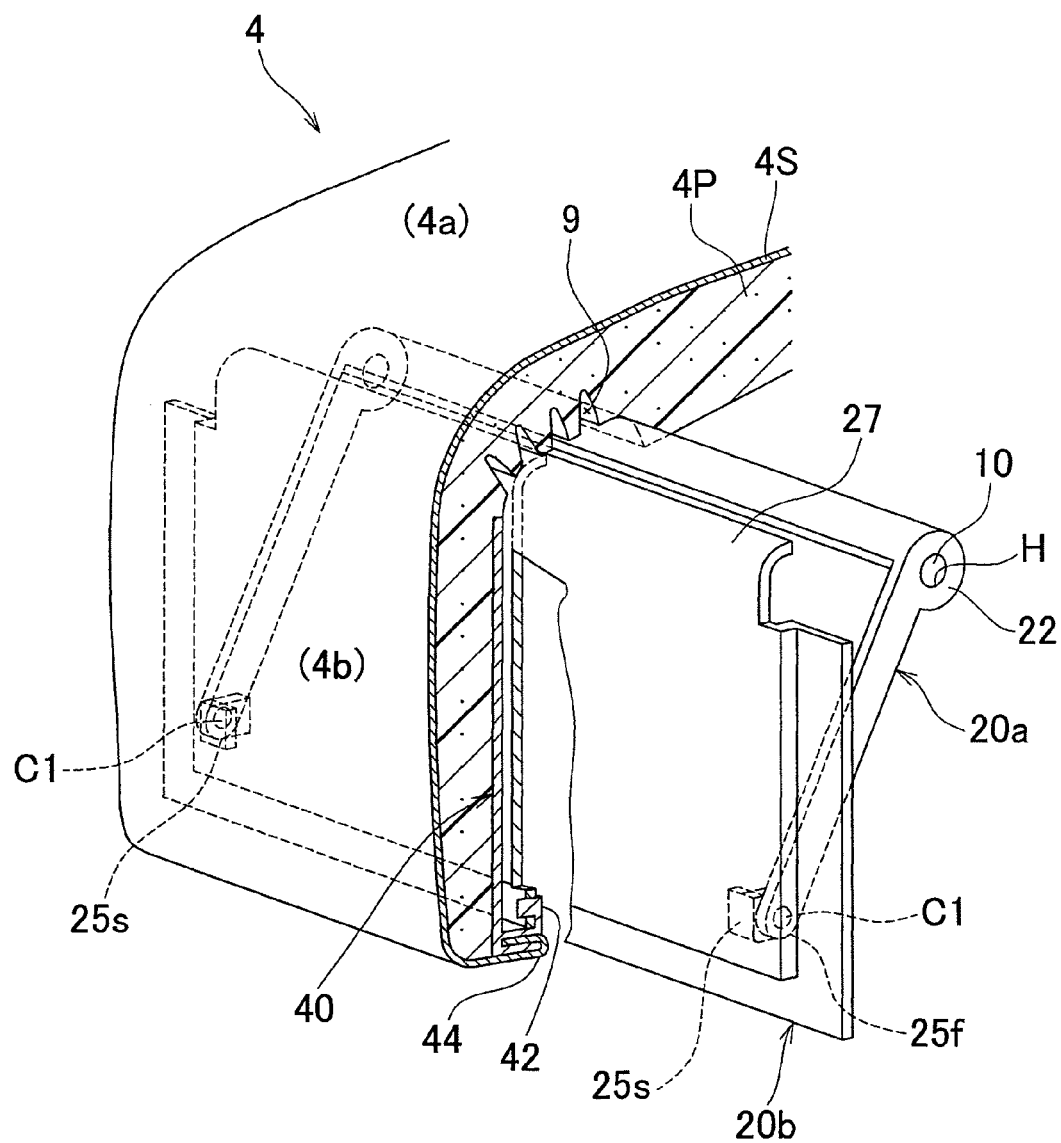
FIG. 4 is a fractured perspective view of the portion of the seat cushion.
Figure 5:
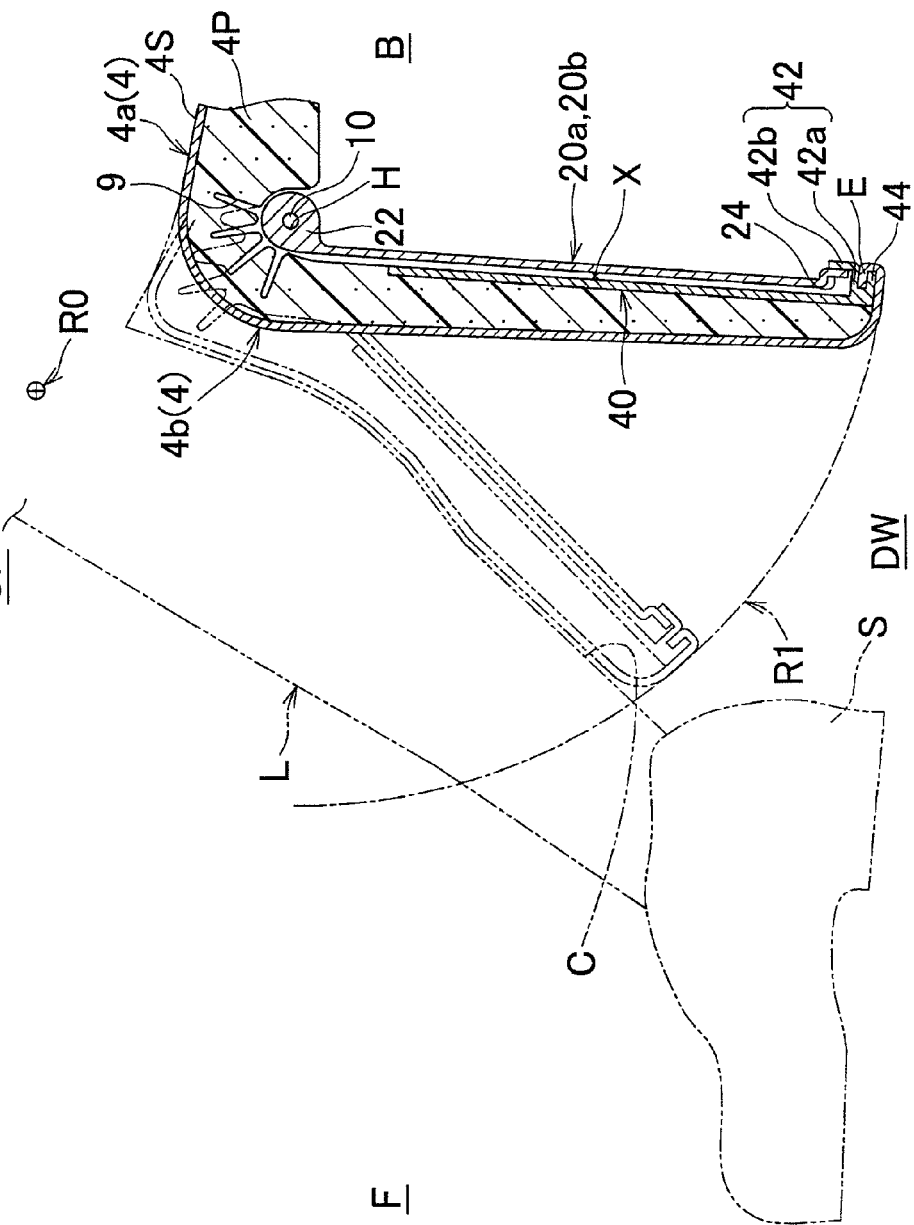
FIG. 5 is a longitudinal sectional view schematically showing a portion of the seat cushion, and is also a reference diagram showing a first path of the ottoman portion.

The first frame member 20a is a flat member that has a generally rectangular shape (when viewed from the side), and has a shaft receiving portion 22, a first attaching portion 23f, and a first shaft supporting portion 25f (see FIGS. 3 and 4). The shaft receiving portion 22 is a portion that forms a general circle when viewed from the side, and is formed on one end side of the first frame member 20a (the side facing the cushions 4P, 6P, and 8P in the first position). An insertion hole H into which the shaft member 10 can be inserted is formed in the center of the shaft receiving portion 22. Also, the first attaching portion 23f is a through-hole that is formed toward one end of the first frame member 20a, and enables the spreading member 50 that will be described later to be attached. Also, the first shaft supporting portion 25f is a through-hole that is formed in the other end side of the first frame member 20a, and enables one end of the connecting frame member 20b that will be described later to be attached.

(Connecting Frame Member)

The connecting frame member 20b is a flat member that has a general rectangular shape (when viewed from the side), and has an engaging portion 24, a second attaching portion 23s, a second shaft supporting portion 25s, a curved portion 27, and a lock portion 32 (i.e., a lock mechanism) that will be described later (see FIGS. 3 and 4). The engaging portion 24 is a crank-shaped (in a longitudinal sectional view) bent portion that is formed on the other end of the connecting frame member 20b, and is able to engage with the second frame member 40 that will be described later. Also, the second attaching portion 23s is a portion that is formed toward one end (i.e., in a position where it is able to face the first attaching portion 23f) of the connecting frame member 20b, and enables the spreading member 50 to be attached. The second attaching portion 23s in this example embodiment is a flat portion (generally semicircular) that stands upright on the back surface (i.e., the side facing the first frame member 20a) of the connecting frame member 20b, and has a through-hole in the center. Also, the second shaft supporting portion 25s is a flat portion (generally semicircular) that stands upright on the back surface of the connecting frame member 20b, and has a through-hole in the center. The second shaft supporting portion 25s may be formed on the other end side of the connecting frame member 20b, corresponding to the first shaft supporting portion 25f. The curved portion 27 is a curved portion that is fonned on one end of the connecting frame member 20b and gently arcs toward the first frame member 20a. Incidentally, in the first position, the curved portion 27 is arranged below the shaft member 10 (see FIG. 4).

(Spreading Member)

The spreading member 50 is a generally V-shaped member and has a pair of arms (i.e., a first arm 51 and a second arm 52), a shaft body 54 (that has a cylindrical shape), and an urging member 56 (see FIG. 3). The first arm 51 and the second arm 52 are both flat, generally rectangular-shaped members (that are short). In this example embodiment, one end of the first arm 51 and one end of the second arm 52 are rotatably attached to each other via the shaft body 54. Also, the other end of the first arm 51 and the other end of the second arm 52 are urged apart (so as to spread apart in a general V shape) by attaching the urging member 56 (such as a spring) to the shaft body 54.

(Assembly of the first frame member and the connecting frame member) In this example embodiment, a pair of the first frame members 20a is provided, one on each side of the seat, as shown in FIGS. 3 and 4. At this time, the shaft member 10 is inserted into the shaft receiving portion 22 (i.e., the insertion hole H), such that one end side of each first frame member 20a is rotatably supported about the shaft member 10. Then the other end of each first frame member 20a is able to be displaced between a downward pointing position (i.e., a position in which it points downward with respect to the seat) and a forward extended position (i.e., a position in which it extends out in front of the seat), according to a rotating operation of the first frame members 20a. Next, the first shaft supporting portions 25f and the second shaft supporting portions 25s are rotatably connected together (i.e., form a spreading center C1) via a shaft member, not shown. As a result, one end of the first frame member 20a and one end of each connecting frame member 20b are able to spread apart with the spreading center C1 as the base end.

Moreover, in this example embodiment, the spreading members 50 are arranged between the first frame members 20a and the connecting frame member 20b.

At this time, the other end of the first arm 51 is rotatably attached to the first attaching portion 23f, and the other end of the second arm 52 is rotatably attached to the second attaching portion 23s. Then the one end sides of the frame members 20a and 20b are urged away from each other (i.e., are spread apart) by the spreading force (i.e., the urging force of the spreading members 50) of the pairs of arms 51 and 52.

(Second Frame Member)

The second frame member 40 is a flat member that is generally rectangular (when viewed from the side), and has an engagable portion 42, an attaching portion 44, an insertion portion 46, and a lockable portion 34 (i.e., a lock mechanism) that will be described later (see FIGS. 2A, 2B, and 3). The engagable portion 42, the attaching portion 44, and the insertion portion 46 are all formed at the other end side of the second frame member 40. The insertion portion 46 is a hole portion that extends through the second frame member 40 in the direction of thickness, and enables the lock mechanism (i.e., a pressing member 36) that will be described later to be attached. The attaching portion 44 is a bent portion (i.e., a portion that is bent toward the engagable portion 42) of the front end of the second frame member 40, and enables an end E of the cover material 4S to be attached. In this example embodiment, a gap is formed between the attaching portion 44 and the engagable portion 42 (i.e., an upright piece 42a), and the end E of the cover material 4S is inserted into this gap.

Also, the engagable portion 42 is a flat portion that is generally L-shaped (in a longitudinal sectional view), and can engage with the other side (i.e., the engaging portion 24) of the connecting frame member 20b (see FIG. 2A). Also, the engagable portion 42 has the upright piece 42a and a bent piece 42b (both of which are flat). The upright piece 42a stands upright on the back surface of the front portion of the second frame member 40. Also, the bent piece 42b is bent from the upright piece 42a toward the engaging portion 24 described above.

(Assembly of the Second Frame Member and the Connecting Frame Member)

The second frame member 40 is fixed to the underside of the front portion (i.e., the ottoman portion 4b) of the cushion 4P. At this time, the expansion and contraction of the cushion 4P is able to be more reliably allowed by arranging the second frame member 40 in front of the plurality of concave portions 9. Next, the engaging portion 24 is inserted into (i.e., engaged with) the engagable portion 42, such that the second frame member 40 and the connecting frame member 20b engage by the lock mechanism that will be described later, while facing each other in the thickness direction. As a result, the other side of the second frame member 40 is connected to the other side of the first frame member 20a via the connecting frame member 20b. At this time in this example embodiment, a clearance is provided between the back surface of the second frame member 40 and the bent piece 42b (i.e., a gap X is formed between the second frame member 40 and the connecting frame member 20b) by setting the length dimension and the like of the upright piece 42a appropriately.

Figure 6:
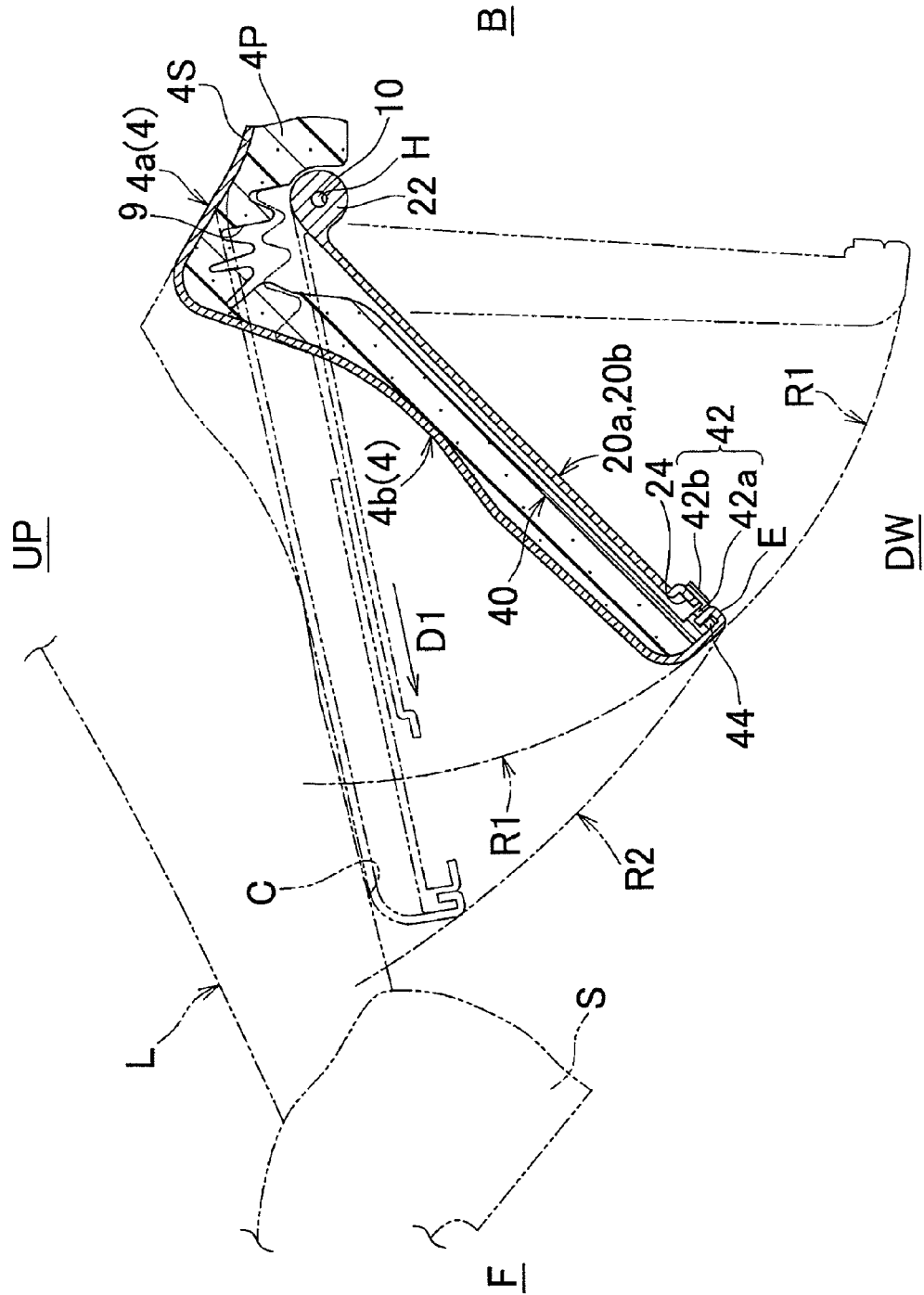
FIG. 6 is a longitudinal sectional view schematically showing a portion of the seat cushion, and is also a reference diagram showing a second path of the ottoman portion.

The connecting frame member 20b and the second frame member 40 are able to move relative to one another in a radial direction D1 rotation of the first frame member 20a by releasing the lock mechanism that will be described later (see FIG. 6). The frame members 20b and 40 may also be engaged so as not to separate from each other in a direction other than the radial direction D1 of rotation (i.e., the longitudinal direction of the seat in the first position, and the vertical direction of the seat in the second position), by appropriately adjusting the length dimensions of the engagable portion 42 and the engaging portion 24, or the like.

(Lock Mechanism)

Figure 2B:
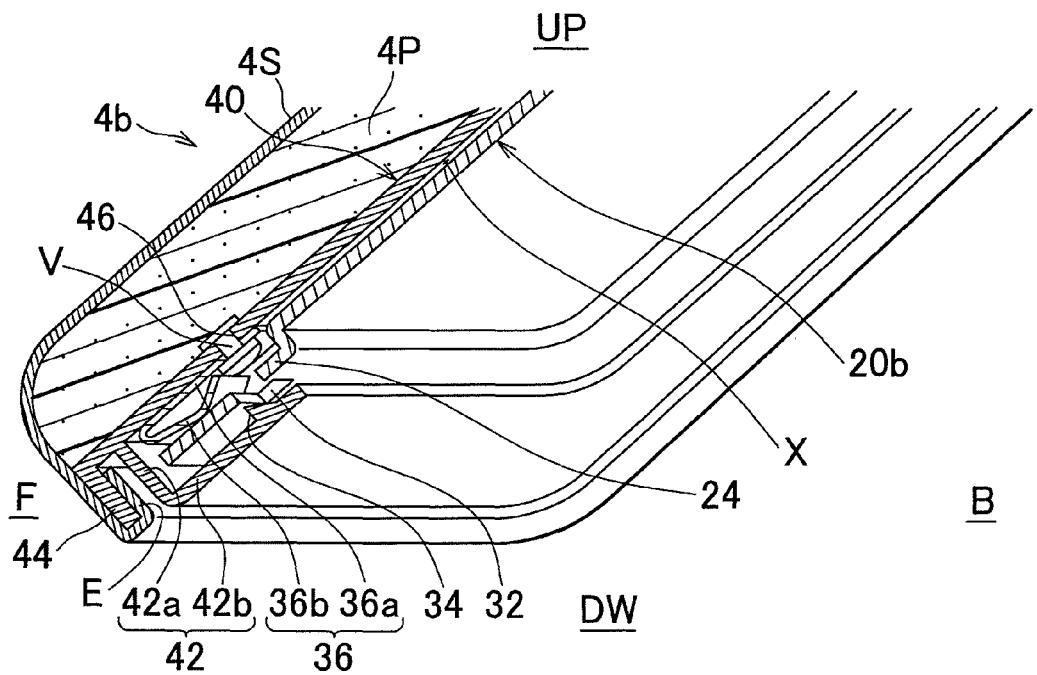
FIG. 2B is a longitudinal sectional view schematically showing the portion of the ottoman portion when unlocked.

The lock mechanism of this example embodiment is a member that restricts relative movement between the first frame member 20a and the second frame member 40, and has a lock portion 32, a lockable portion 34, and a pressing member 36 (see FIGS. 2A and 2B). The lock portion 32 is a through-hole provided in the engaging portion 24 (at the other side of the connecting frame member 20b). Also, the lockable portion 34 is a convex portion provided on the bent piece 42b (at the other side of the second frame member 40), and stands upright in a position facing the lock portion 32. The pressing member 36 is a plate spring member that is generally U-shaped, and has a base portion 36a and a spring portion 36b. The base portion 36a (that has a flat shape) has an insertion hole H into which a screw member V can be inserted. Also, the spring portion 36b is a bent portion (that is generally V-shaped in a longitudinal sectional view) that is connected to the base portion 36a.

In this example embodiment, the pressing member 36 is arranged between the second frame member 40 and the connecting frame member 20b (see FIGS. 2A and 2B). At this time, the base portion 36a is attached via the screw member V to the back surface of the second frame member 40, and the bent piece 42b is arranged facing the connecting frame member 20b side. The connecting frame member 20b is pressed away from the second frame member 40 (thus forming a gap X between the frame members 20b and 40) by the urging force of the pressing member 36. The lockable portion 34 is inserted into the lock portion 32 by the urging force of this pressing member 36, thus enabling the second frame member 40 and the connecting frame member 20b to engage together so that they are unable to move relative to one another. Next, by pressing the second frame member 40 to the connecting frame member 20b side, the gap X (i.e., the gap between the frame members) becomes smaller against the urging force of the pressing member 36, such that the lockable portion 34 disengages from the lock portion 32. As a result, the frame members unlock, thus enabling the connecting frame member 20b and the second frame member 40 to move relative to one another.

[Positional Displacement of Ottoman Portion]

In the first position, the ottoman portion 4b is compactly arranged pointing downward with respect to the seat at a lower portion of the seat so as not to get in the way of the occupant (i.e., the bent legs L of the occupant). Then the ottoman portion 4b is displaced to the second position by rotating the first frame member 20a forward, with respect to the seat, about the shaft member 10. At this time in this example embodiment, the ottoman portion 4b creates a first rotation path R1 (see FIGS. 5, 2A, and 2B) by the lock mechanism restricting the relative rotation between the second frame member 40 and the connecting frame member 20b. At this time, the cushion 4P would be in a slightly elastically contracted state (i.e., raised up at an upper portion of the seat in FIG. 5) by the rotation of the ottoman portion 4b, if the spreading member 50 of this example embodiment was not provided. The rotation path of the ottoman portion 4b (i.e., the first rotation path R1) is relatively compact, so the ottoman portion 4b is able to contact the calves C of the occupant without contacting the shoes S or the like of the occupant, for example (i.e., the structure is user-friendly).

(Extension of the Seat Cushion)

In this example embodiment, one side of the first frame member 20a and one side of the second frame member 40 spread apart by the elastic expansion of the cushion 4P (i.e., by the cushion 4P being release from the elastically contracted state) with the displacement from the first position to the second position (see FIG. 3). More specifically, the one side of the first frame member 20a and the one side of the second frame member 40 move away from one another by the first frame member 20a and the connecting frame member 20b spreading apart in a general V shape with the spreading center C1 being the base end. At this time, the urging force of the spreading member 50 facilitates the spreading apart of the first frame member 20a and the connecting frame member 20b. Also, the one side of the second frame member 40 moves away from the one side of the first frame member 20a as the connecting frame member 20b moves. As a result, the one side of the first frame member 20a and the one side of the second frame member 40 spread apart, such that the length dimension of the seat cushion (i.e., extension length L1) is able to be increased by the ottoman portion 4b moving from the sitting portion 4a. Then the curved portion 27 is arranged in a gap that forms at the one side of the frame members, and supports the cushion 4P (i.e., the extension portion) from underneath. As a result, the length dimension of the seat cushion 4 can be increased while maintaining the sittability of the seat as much as possible.

Next, the second frame member 40 is pressed to the connecting frame member 20b side by the ottoman portion 4b contacting the legs L of the occupant, as shown in FIGS. 2A, 2B, 3, and 5. As a result, the gap X becomes smaller against the urging force of the pressing member 36, such that the lockable portion 34 disengages from the lock portion 32 (i.e., the lock is released). When the lock is released in this way, the connecting frame member 20b and the second frame member 40 are able to move relative to each other in the radial direction D1 of rotation of the first frame member 20a (FIG. 6). In this example embodiment, the second frame member 40 moves relative to the connecting frame member 20b in the radial direction Dl of rotation (i.e., in a direction in which the second frame member 40 and the connecting frame member 20b move apart). Therefore, the rotation path of the ottoman portion 4b (i.e., a second rotation path R2) creates a larger arc than the first rotation path R1 and is closer to the rotation path of the legs L of the occupant.

Also, while returning the ottoman portion 4b that is in the second position to the first position, the pressure on the ottoman portion 4b decreases (see FIGS. 1 to 3). As a result, the urging force of the pressing member 36 widens the gap X between the frame members, such that the lock portion 32 is inserted into the lockable portion 34. Engaging the second frame member 40 with the connecting frame member 20b so that they are unable to move relative each other in this way enables the ottoman portion 4b to be maintained in the first position (see FIG. 5). In this example embodiment, the first frame member 20a and the connecting frame member 20b approach one another while facing each other, against the urging force of the spreading member 50, with the positional displacement described above. As a result, in the first position, the ottoman portion 4b is able to be compact by the first frame member 20a and the second frame member 40 being close together (see FIGS. 2 and 3).

As described above, in the example embodiment, the length dimension of the seat cushion 4 can be changed using the mechanism (i.e., the first frame member 20a and the second frame member 40) for positionally displacing of the ottoman portion 4b. Therefore, with this example embodiment, the length dimension of the seat cushion 4 is able to be changed by a simpler structure. Also, with this example embodiment, the length dimension of the seat cushion 4 can be more reliably changed by the spreading member 50.

Further, the ottoman portion 4b of this example embodiment is such that the connecting frame member 20b and the second frame member 40 are arranged facing each other in the thickness direction. Therefore, the thickness dimension of the ottoman portion 4b can be set small, and the mounting space of the ottoman portion 4b can be reduced. Also in this example embodiment, the sitting portion 4a and the ottoman portion 4b are formed with a single continuous cushion 4P. Therefore, the sitting portion 4a and the ottoman portion 4b can be nicely covered (i.e., covered in an aesthetically pleasing manner) by a single piece of the cover material 4S (i.e., the seat can be beautifully finished).

Also, in this example embodiment, the second rotation path R2 of the ottoman portion 4b can be made larger, imitating the rotation path of the legs L of the occupant. Therefore, during positional displacement described above, problems such as clothing of the occupant catching on the ottoman portion 4b and bunching up are able to be prevented or reduced. Moreover, with this example embodiment, making the first rotation path R1 of the ottoman portion 4b smaller (i.e., creating a relatively small arc) enables the ottoman portion 4b to pivot in a compact manner until it contacts the legs L of the occupant (i.e., the structure is user-friendly).

The vehicle seat 2 of this example embodiment is not limited to the example embodiment described above. That is, various other example embodiments are also possible. In the example embodiment described above, the connecting frame member 20b is used, but the seat structure is not limited to this. For example, the first frame member and the second frame member may be directly connected in a spreadable manner. Also, in this example embodiment, the ottoman portion 4b has a plurality of rotation paths. Alternatively, however, the ottoman portion 4b may create a single rotation path. For example, the first frame member and the second frame member may be connected in a manner such that they are unable to move relative to one another in the radial direction of rotation.

Also, in this example embodiment, the spreading member 50 that has the first arm 51 and the second arm 52 is given as an example, but the structure of the spreading member is not limited to this. That is, the spreading member may be, for example, a coil spring member, a member that is able to elastically expand and contract, a member that expands and contracts electrically, or a magnetically repelling member. Incidentally, the spreading member may be omitted if the first frame member and the connecting frame member are able to spread by just the elastic extension of the cushion. Also, aside from the plate spring member, the pressing member 36 may be, for example, a coil spring member, a member that is able to elastically expand and contract, or a member that expands and contracts electrically.

Also, in this example embodiment, a structure in which the lockable portion 34 disengages from the lock portion 32 (i.e., unlocks) by the ottoman portion 4b contacting the legs L of the occupant is described. Alternatively, the structure may be such that a lockable portion disengages from a lock portion (i.e., unlocks) when a sensor member senses an ottoman portion approaching or contacting the legs of the occupant. Further, in this example embodiment, the seat cushion 4 is made to extend while the ottoman portion 4b is being positionally displaced. In this example embodiment, positional displacement of the ottoman portion 4b is able to be stopped at the point at which the seat cushion 4 is extended. According to this structure, with a shorter person, the seat cushion 4 can be made shorter, and with a taller person, the seat cushion 4 can be made longer.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A vehicle seat comprising:
    a seat cushion that includes:
        an elastic cushion that forms a seat contour and extends and contracts;
        a sitting portion on which an occupant sits; and
        an ottoman portion arranged on an end of the sitting portion,
        the ottoman portion having:
            a shaft member that attaches to the sitting portion;
            a first frame member that rotates about the shaft member; and
            a second frame member that is fixed to the cushion, wherein
            a first end of the first frame member is detachably engaged to a first end of the second frame member, and a second end of the first frame member is attached to the shaft member,
        when the first frame member rotates about the shaft member, the ottoman portion is displaceable between a first position in which the ottoman portion is bent so as to point in a downward direction relative to the sitting portion of the seat, and a second position in which the ottoman portion extends in a frontward direction from the sitting portion so as to support a calf of the occupant,
        in the first position, a second end of the second frame member is proximate to the second end of the first frame member, and
        when the ottoman portion is displaced from the first position to the second position, the second end of the second frame member and the second end of the first frame member separate such that a length dimension of the seat cushion increases.

2. The vehicle seat according to claim 1, wherein the ottoman portion further has:
    a connecting frame member that is provided between the first frame member and the second frame member, and is attached on a first end to the first end of the first frame member such that in the first position the first end of the first frame member and the first end of the second frame member are engaged via the connecting frame member; and
    a spreading member that is connected to the connecting frame member and the first frame member between the first frame member and the second frame member such that the spreading member facilitates a spreading apart of the second end of the first frame member and the second end of the second frame member when the ottoman portion is displaced from the first position to the second position.

3. The vehicle seat according to claim 2, wherein when the ottoman portion is displaced from the first position to the second position, the connecting frame member and the second frame member rotate relative to a rotation axis of the shaft member of the first frame member and move relative to one another in the length dimension, and
    engagement of the first end of the first frame member and the first end of the second frame member is released.

4. The vehicle seat according to claim 2, wherein when the ottoman portion is displaced from the first position to the second position, the spreading member facilitates a spreading apart of the second end of the first frame member and a second end of the connecting frame member.

5. The vehicle seat according to claim 1, wherein when the ottoman portion is displaced from the first position to the second position, engagement of the first end of the first frame member and the first end of the second frame member is released.

6. The vehicle seat according to claim 5, wherein when the ottoman portion is displaced from the first position to the second position, the first frame member and the second frame member rotate relative to a rotation axis of the shaft member of the first frame member and move relative to one another in the length dimension.

* * * * *